(12) United States Patent
Lam

(10) Patent No.: US 6,606,219 B2
(45) Date of Patent: Aug. 12, 2003

(54) MAGNETIC TAPE HEAD INCLUDING A TRANSDUCER CLUSTER AND A BLOCK FIXED TO A U-SHAPED FRAME HAVING A RIDGE

(75) Inventor: Chuck Fai Lam, Quarry Bay (HK)

(73) Assignee: Lafe Technology Limited, Kowloon (HK)

( * ) Notice: Subject to any disclaimer, the term of this patent is extended or adjusted under 35 U.S.C. 154(b) by 277 days.

(21) Appl. No.: 09/795,911

(22) Filed: Feb. 28, 2001

(65) Prior Publication Data

US 2002/0118489 A1 Aug. 29, 2002

(51) Int. Cl.[7] ................................................ G11B 5/48
(52) U.S. Cl. ....................................... 360/129; 360/122
(58) Field of Search ................................ 360/240, 118, 360/122, 125, 128, 129

(56) References Cited

U.S. PATENT DOCUMENTS

| | | | | |
|---|---|---|---|---|
| 4,797,767 A | * | 1/1989 | Baus, Jr. ..................... 360/121 |
| 4,825,532 A | * | 5/1989 | Ricards ..................... 29/603.06 |
| 4,864,717 A | * | 9/1989 | Baus, Jr. ..................... 29/603.5 |
| 5,063,469 A | * | 11/1991 | Tandai ......................... 360/128 |
| 5,075,809 A | * | 12/1991 | Heinz et al. ................. 360/128 |
| 5,333,372 A | * | 8/1994 | Fujioka et al. ........... 29/603.21 |
| 5,402,294 A | * | 3/1995 | Gooch et al. ............... 360/125 |
| 5,423,116 A | * | 6/1995 | Sundaram ................... 29/603.1 |
| 5,883,765 A | * | 3/1999 | Gaud et al. ................. 360/126 |
| 6,040,964 A | * | 3/2000 | Saliba ......................... 360/121 |

* cited by examiner

*Primary Examiner*—Jefferson Evans
(74) *Attorney, Agent, or Firm*—Sidley Austin Brown & Wood LLP

(57) ABSTRACT

A magnetic tape head assembly is provided along with a method of manufacturing a magnetic tape head. The magnetic tape head comprises a cluster of thin film inductive or magnetoresistive read/write elements, an I-block preferably made of a ceramic material, a U-bar also preferably made of a ceramic material, and a base preferably made of a ceramic or metal material. The U-bar has a substantially U-shaped form providing a recess into which the I-block and the cluster are fixed. A bottom surface of the U-bar, I-block, and cluster is fixed to the base to form a slider assembly. A top surface of the U-bar, I-block, and cluster is machined or etched to form one or more tape bearing surfaces thereon.

7 Claims, 3 Drawing Sheets

MAGNETIC TAPE HEAD INCLUDING A TRANSDUCER CLUSTER AND A BLOCK FIXED TO A U-SHAPED FRAME HAVING A RIDGE

FIELD OF THE INVENTION

The invention relates to a thin-film magnetic head for use in magnetic tape recording. Further, the invention relates to a method of producing such a thin-film magnetic tape head.

DESCRIPTION OF THE RELATED ART

Ever growing demands for high performance and low cost magnetic recording for application in tape backup systems urge the need for improved product design and related manufacturing processes.

For the special features of linear longitudinal tape head design, conventional head structures heretofore typically consist of four to five separate components to form a slider on which a tape bearing surface is built. These components are glued together with high performance adhesive to form a rigid, non-moving body to service the high-speed, high-pressure and highly abrasive tape contact for its read and write function.

The multitude of components in the prior art designs increases the complexity in the assembly processes. The stability of a head structure built with many building blocks also lowers the stability of the combination structure.

For proper operation, different pieces of the tape bearing surface must be highly coplanar in order to ensure sufficient tape contact. Any minute shift of one component relative to the others can produce a tiny step on the tape bearing surface, which may result in an increase in the effective separation distance between the tape and head. In the latter case, the read/write signal is attenuated.

Conventional head structures have the common problem of too many components and involve a relatively large amount of adhesive bonding to form the structure. The multitude of components adhered together can render the magnetic head structurally unstable. During service life, individual portions of the combination head can shift relative to each other due to aging of the adhesive and other stresses, forming detrimental stepped tape bearing surfaces.

BRIEF SUMMARY OF THE INVENTION

An object of the present invention is to overcome these and other shortcomings of structural instability in the prior art designs.

Another object of the present invention is to provide a structurally sound magnetic recording head with simplified manufacturing processes and material control.

In accordance with the present invention, a magnetic tape recording head is provided which includes a U-bar, which is a U-shaped frame having a back portion extending in a longitudinal direction and two spaced-apart leg portions extending from the back portion of the frame in a lateral direction. The magnetic tape head also includes a ceramic block, called an I-block, which is fixed to the frame such that the I-block partially fills the space between the leg portions of the frame. The magnetic tape head further includes a cluster fixed to the frame such that at least a portion of the cluster partially fills the space between the leg portions of the frame. In addition, the I-block and the cluster are arranged such that the I-block is interposed between the cluster and the back portion of the frame.

One or more ridges are formed in a top surface of the combination of the U-bar, the I-block, and the cluster. This top surface is parallel to a plane defined by the longitudinal direction in which the back portion of the U-bar extends and by the lateral direction in which the leg portions of the U-bar extend. Each of these ridges provides a tape bearing surface of the magnetic tape head. One of these tape bearing surfaces may include a portion of the cluster for interfacing with a tape, and for improved structural stability this tape bearing surface may also include a portion of the I-block.

The combination of the U-bar, the I-block, and the cluster may be fixed to a base member preferably made of ceramic or metal, such as aluminum, to further improve structural stability.

According to another aspect of the present invention, a method of manufacturing a magnetic tape head is provided including a step of providing a U-bar, which is a U-shaped frame having a back portion extending in a longitudinal direction and two spaced-apart leg portions extending from the back portion of the frame in a lateral direction. The method also includes a step of fixing a ceramic block, called an I-block, to the frame such that the I-block partially fills the space between the leg portions of the frame. The method further includes a step of fixing a cluster to the frame such that at least a portion of the cluster partially fills the space between the leg portions of the frame. In addition, the I-block and the cluster are arranged such that the I-block is interposed between the cluster and the back portion of the frame. Finally, the method includes a step of forming at least one ridge in a surface which includes a portion of the top surface of the U-bar as described above.

According to still another aspect of the present invention, a method of manufacturing a magnetic tape head is provided including a step of providing a frame bar having a back portion extending in a longitudinal direction and a plurality of spaced-apart leg portions extending from the back portion of the frame bar in a lateral direction. The method also includes a step of fixing at least one ceramic block, called an I-block, to the frame bar such that the I-block partially fills a space between two respective ones of the plurality of leg portions of the frame bar. The method further includes a step of fixing a cluster to the frame bar such that at least a portion of the cluster partially fills the space between two respective ones of the plurality of leg portions of the frame bar. In addition, the I-block and the cluster are arranged such that the I-block is interposed between the cluster and the back portion of the frame bar. In accordance with this method, one or more magnetic tape heads may be assembled from a single frame bar. This may be accomplished by including a step of cutting the frame bar into at least two pieces, at least one of the two pieces including a portion of the frame bar, the at least one I-block, and the at least one cluster. Also, this method includes a step of forming at least one ridge in a surface which includes a portion of the top surface of the frame bar as described above. The step of forming at least one ridge may be performed before the step of cutting the frame bar to facilitate forming ridges in one or more magnetic tape heads at once.

Finally, the above methods may include a step of fixing the combination of the U-bar, the I-block, and the cluster to a base member preferably made of ceramic or metal, such as aluminum, to further improve structural stability. Also, one or more of the steps of providing an I-block bar, which is an uncut plurality of I-blocks, and providing a cluster bar, which is an uncut plurality of clusters, cutting the I-block bar into at least two pieces, and cutting the cluster bar into at least two pieces. In addition, a step of fixing the I-block bar to the cluster bar may be performed before the steps of cutting the I-block bar and cutting the cluster bar, so that the I-block bar and the cluster bar are cut in a single operation.

BRIEF DESCRIPTION OF THE SEVERAL VIEWS OF THE DRAWINGS

Other advantages and features of the invention will become more apparent with reference to the following detailed description of the invention in connection with the accompanying drawings, wherein like reference numerals have been applied to like elements, in which.

DETAILED DESCRIPTION OF THE INVENTION

Figure 1:
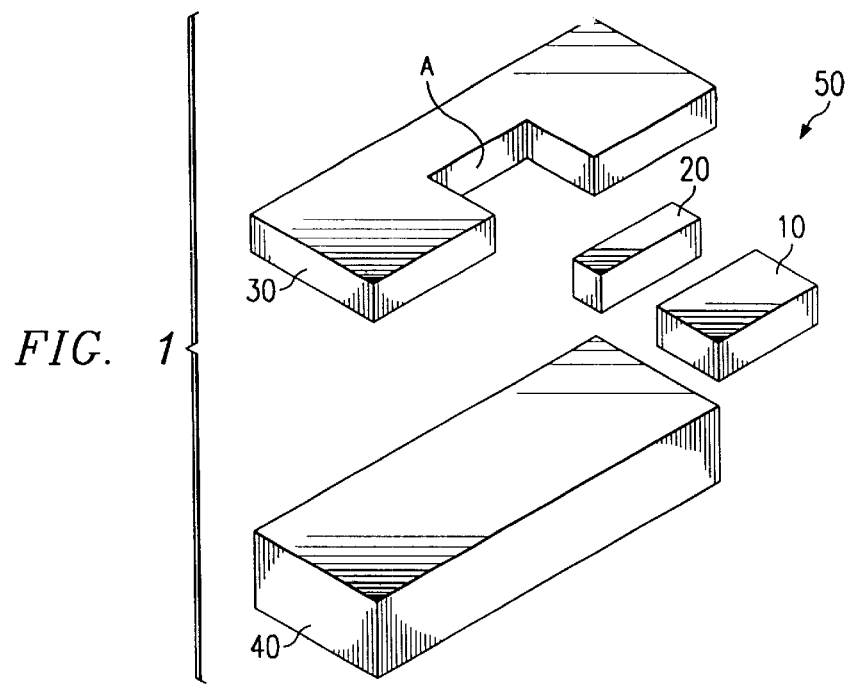
FIG. 1 is a perspective exploded view of a magnetic tape head in accordance with the present invention.

Referring to FIG. 1, a first preferred embodiment of the present invention is shown. A slider 50 of the present invention includes a cluster 10 comprising a plurality of inductive thin-film or magnetoresistive read/write transducer elements (not shown). Also included are an I-block 20 and a U-bar 30, both of which are preferably made of a ceramic material, such as aluminum oxide titanium carbide (AlTiC) or ferrites. The combination of the cluster 10, the I-block 20, and the U-bar 30 are fixed to a base plate 40. Each of the cluster 10, the I-block 20, and the U-bar 30 may be fixed at their respective positions using a structural adhesive, such as Bondline 6460™ from Bondline Electronic Adhesive, Inc. or Ablebond 931™ from Ablestik Electronic Materials & Adhesives. The surface A is a receiving surface for the I-block 20, the significance of which will be revealed below.

The cluster 10 of the present invention may be a cluster or chip read/write head such as an inductive thin-film head or magnetoresistive head, comprising a plurality of transducer elements for reading/writing data to a recording medium such as a recording tape. The cluster 10 is preferably cut to high dimensional and geometrical precision to ensure controlled bond lines 60, 70, and 80 shown in FIG. 2 after assembly.

The I-block 20 serves to protect the delicate transducer devices of the cluster 10 so that the transducer devices will not be damaged during manufacturing. The I-block 20 also serves to simplify the manufacturing process, as will be discussed below.

The U-bar 30 forms a frame onto which the I-block 20 and the cluster 10 are fixed. As shown in FIG. 1, the U-bar 30 has a substantially U-shaped form, which includes a back portion extending in a longitudinal direction and two leg portions extending in a lateral direction from the back portion. The U-shape of the U-bar 30 provides a space for positioning the I-block 20 and the cluster 10, so that the U-bar 30 partially frames the combination of the I-block 20 and the cluster 10. The surfaces of the U-bar 30 facing this space are preferably provided with precise dimensional and geometric accuracy so that the cluster 10 and the I-block 20 fit into the space leaving only a small glue line of adhesive. A thickness of a preferred glue line at each of the bond lines 60, 70, 80, and 90 is in the range of 0.0001–0.0005 inches, depending on the requirements of the adhesive used to join the cluster 10 and the U-bar 30.

Figure 2:
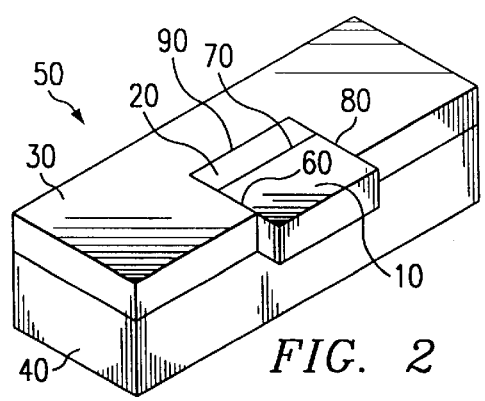
FIG. 2 is a perspective view showing an intermediate step of manufacturing a magnetic tape head in accordance with the present invention.

FIG. 2 shows how the I-block 20 and the cluster 10 are positioned and partially framed by the U-bar 30. The combination of the cluster 10, the I-block 20, and the U-bar 30 are bonded to the base plate 40 to form the basic structure of the slider 50.

Figure 3:
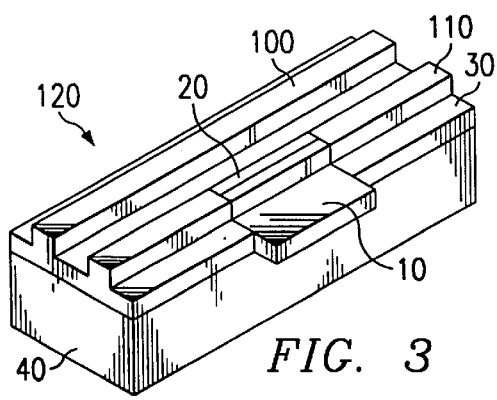
FIG. 3 is a perspective view of a magnetic tape head in accordance with a first embodiment of the present invention.

FIG. 3 shows a final magnetic head assembly 120 in accordance with the first embodiment of the present invention. This final assembly 120 includes tape bearing surfaces 100 and 110, which are narrow ridges formed by machining or etching adjacent portions of a top portion of the slider 50. Once formed, it is preferable to profile and highly-polish the tape bearing surfaces 100 and 110 to allow for a smooth, low friction contact for a magnetic tape to pass over.

As mentioned above, the I-block 20 serves to simplify the manufacturing of the magnetic recording head of the present invention. It is preferable to have a controlled bond lines surrounding the cluster 10. However, it is difficult to achieve a desired level of precision on the surface A (shown in FIG. 1) of the U-bar 30 in order to adequately achieve the controlled bond line at the device surface of the cluster 10. However, by interposing the I-block 20 between the cluster 10 and the surface A, the I-block 20 can compliment a geometrical mismatch between the cluster 10 and the surface A of the U-bar 30. The bond line 70 between the I-block 20 and the cluster 10 may be controlled with relative ease, so that the bond line 90 between the I-block 20 and the U-bar 30 becomes less critical, thereby reducing the precision required for creating the surface A of the U-bar 30.

In the first embodiment, two tape bearing surfaces are provided. Of the two, only the first tape bearing surface 110 includes a portion of the read/write transducers of the cluster 10. The major function of the second tape bearing surface 100 is to stabilize a magnetic tape as the magnetic tape is passing over the tape bearing surface. This type of inactive, stabilizing rail (the second tape bearing surface 100) is generally referred to as an outrigger.

Figure 4:
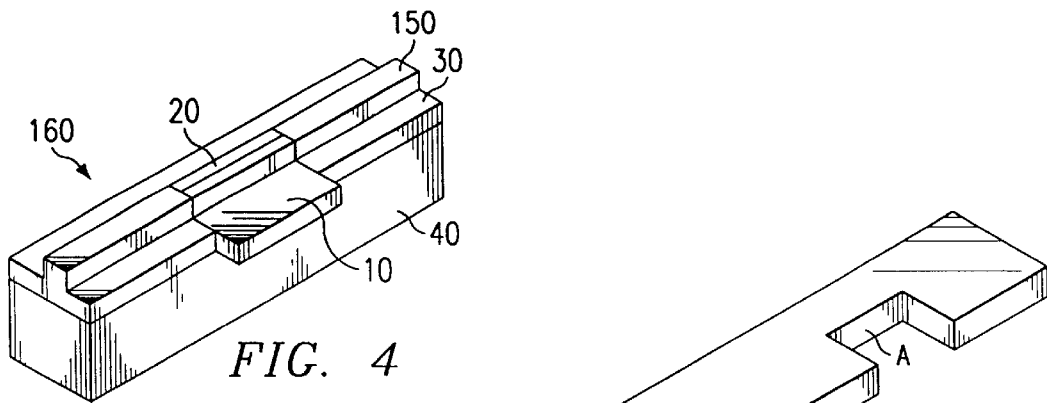
FIG. 4 is a perspective view of a magnetic tape head in accordance with a second embodiment of the present invention.

FIG. 4 shows a magnetic head assembly 160 in accordance with a second embodiment of the present invention. The magnetic head assembly 160 of the second embodiment is formed from the slider 50 as shown in FIG. 2, including a cluster 10, an I-block 20, a U-bar 30, and a base 40 as described above for the first embodiment. However, as shown in FIG. 4, the magnetic head assembly 160 of the second embodiment has only one tape bearing surface 150 as opposed to two tape bearing surfaces in the first embodiment. Thus, the second embodiment provides the option of not providing an outrigger.

FIGS. 5–9 show the present invention as produced by an alternative method of manufacturing. In summary, this method involves the bonding, machining, and lapping of a plurality of heads in a single frame bar, thus reducing manufacturing costs.

Figure 5A:
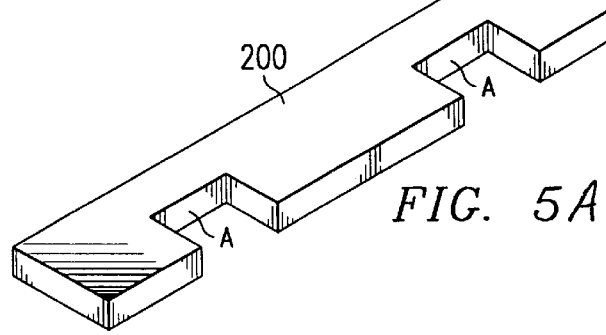
FIG. 5A is a perspective view of a frame bar structure used in a method of manufacturing a magnetic tape head in accordance with the present invention.
Figure 5B:
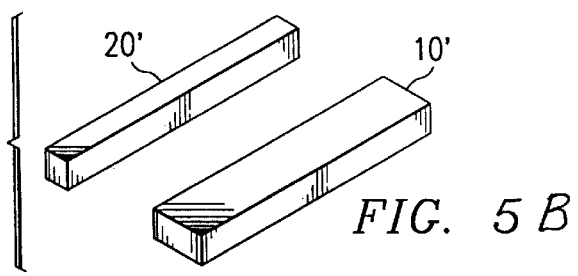
FIG. 5B is a perspective view of an I-block bar and a cluster bar, both used in a method of manufacturing a magnetic tape head in accordance with the present invention.

FIG. 5A shows a frame bar 200 in which three recesses are provided. The frame bar 200 is essentially a row of uncut U-bars, and is preferably made of a ceramic material. FIG. 5B shows a cluster bar 10' and an I-block bar 20'. The cluster bar 10' is essentially a row of uncut clusters 10, and the I-block bar 20' is essentially a row of uncut I-blocks 20.

Figure 6:
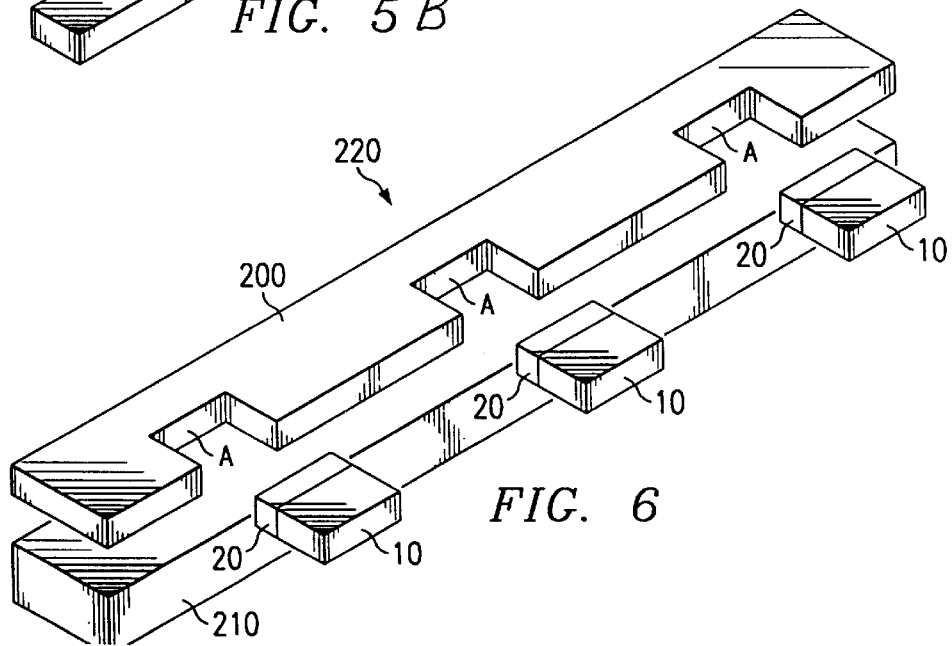
FIG. 6 is a perspective view of a step of a method of manufacturing a magnetic tape head in accordance with the present invention.
Figure 7:
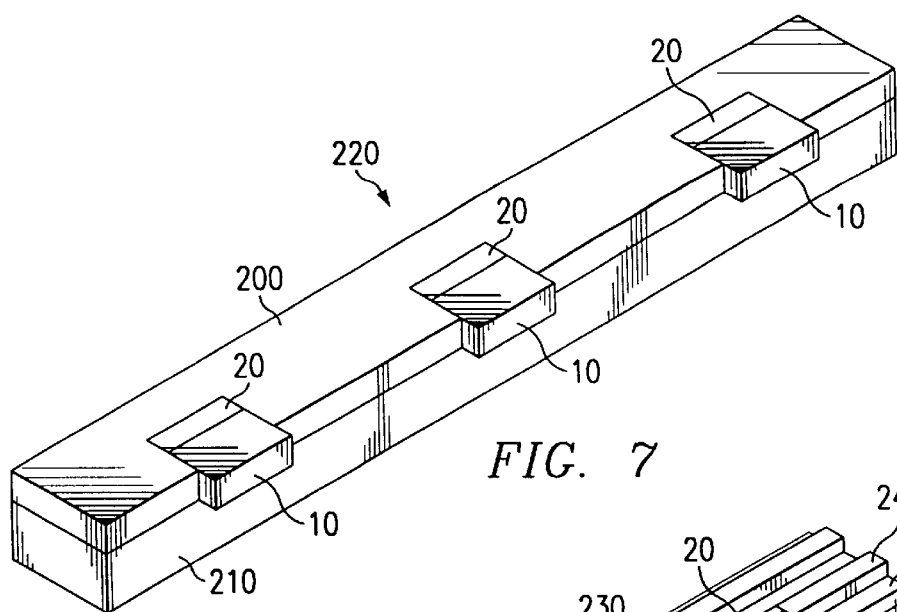
FIG. 7 is a perspective view of a step of a method of manufacturing a magnetic tape head in accordance with the present invention.

As shown in FIG. 6, a plurality of I-blocks 20 and a clusters 10 are cut from the I-block bar 20' and the cluster bar 10', respectively. Preferably, the cluster bar 10' and the I-block bar 20' are fixed to one another before being cut into individual cluster 10/I-block 20 assemblies. Each cluster 10/I-block 20 assembly is fixed into a respective recess of the frame bar 200, such that each I-block 20 is fixed between each respective surface A and a respective cluster 10. A base bar 210 is provided, and bottom surface of the combination of the frame bar 200, I-blocks 20, and clusters 10 is bonded to the top surface of a base bar 210 to form a slider bar 220 as shown in FIG. 7. Again, each of these items may be fixed to one another using a structural adhesive such as the examples provided above.

Figure 8:
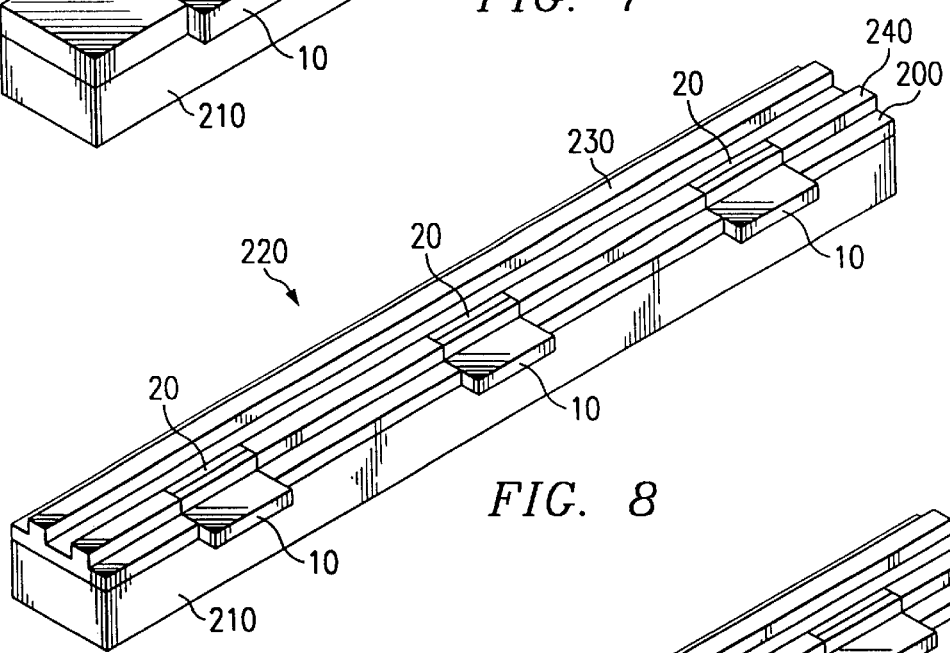
FIG. 8 is a perspective view of a step of a method of manufacturing a magnetic tape head in accordance with the present invention.
Figure 9:
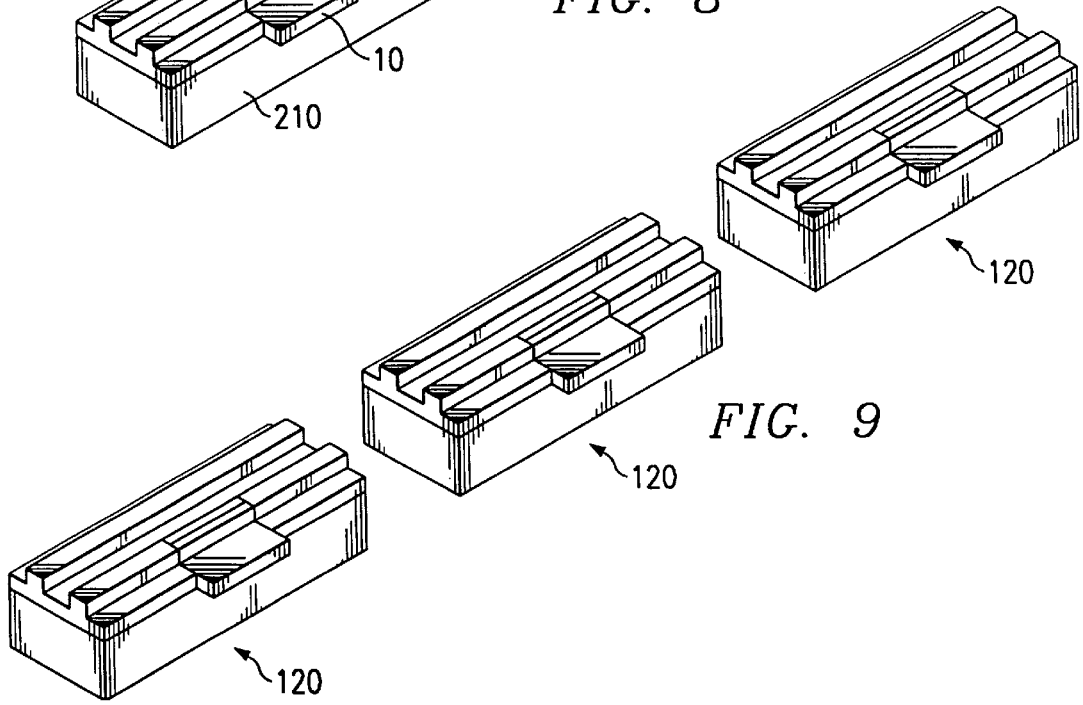
FIG. 9 is a perspective view of a step of a method of manufacturing a magnetic tape head in accordance with the present invention.

Once the slider bar 220 has been assembled, narrow rails are formed in a top surface of the slider bar 220 to provide two tape bearing surfaces 230 and 240 as shown in FIG. 8. Then, individual heads are cut off from the slider bar 220 to form a final magnetic head assembly 120 as shown in FIG. 9.

While this method is illustrated in FIGS. 5–9 by way of an example in which three magnetic heads are assembled at once, one skilled in the art would appreciate that this method is not restricted to three, but may be adapted to manufacture any number of magnetic heads at once. In addition, this method may be easily adapted to assemble heads in accordance with the second embodiment, wherein only a single tape bearing surface is formed. Finally, the descriptions above are not intended to restrict in any way the order in which the frame bar 200, each I-block 20, each cluster 10, and the base bar 210 must be assembled.

The above-described method may also be modified such that portions of the slider bar 220 are cut off before forming tape bearing surfaces thereon. Such a modification may be desirable, for example, if magnetic heads having differing numbers of tape bearing surfaces are desired.

Although the present invention has been fully described by way of preferred embodiments and methods, one skilled in the art will appreciate that other embodiments and methods are possible without departing from the spirit and scope of the present invention. For example, while embodiments have been provided with one or two tape bearing surfaces, it may be desirable to provide any number of tape bearing surfaces

What is claimed is:

1. A tape head assembly comprising:
    a frame having a generally U-shaped form, having a back portion extending in a longitudinal direction and two spaced-apart leg portions extending from the back portion in a substantially lateral direction;
    a block fixed to the frame such that the block partially fills a space between the leg portions; and
    a cluster fixed to the frame and the block such that at least a portion of the cluster partially fills the space between the leg portions and such that the block is interposed between the cluster and the back portion of the frame,
    said frame having a first surface having at least one ridge formed therein extending in the longitudinal direction.

2. A tape head assembly in accordance with claim 1, wherein the at least one ridge has a tape bearing surface.

3. A tape head assembly in accordance with claim 2, wherein the at least one ridge includes a portion of the cluster.

4. A tape head assembly in accordance with claim 3, wherein the at least one ridge further includes a portion of the block.

5. A tape head assembly in accordance with claim 4, wherein the first surface has a plurality of ridges.

6. A tape head assembly in accordance with claim 1, wherein the frame has a second surface opposite the first surface and wherein the tape head assembly further comprises a base member fixed to the second surface of the frame.

7. A tape head assembly in accordance with claim 1, wherein the cluster includes at least one thin-film transducer element.

* * * * *